United States Patent [19]

Tanaka et al.

[11] Patent Number: 5,343,377
[45] Date of Patent: Aug. 30, 1994

[54] METHOD OF CONTROLLING SWITCHING REGULATOR

[75] Inventors: Juichi Tanaka; Itsuo Yuzurihara; Takashi Watanabe, all of Yokohama, Japan

[73] Assignee: Kyosan Electric Mfg. Co., Ltd., Yokohama, Japan

[21] Appl. No.: 969,140

[22] Filed: Oct. 30, 1992

[30] Foreign Application Priority Data

Nov. 13, 1991 [JP] Japan .................. 3-297371

[51] Int. Cl.⁵ .................. H02M 3/337; H02M 7/5387
[52] U.S. Cl. .................. 363/17; 363/56; 363/132
[58] Field of Search .................. 363/17, 98, 132, 56, 363/58, 97, 131, 136

[56] References Cited

U.S. PATENT DOCUMENTS

| | | | |
|---|---|---|---|
| 4,541,041 | 9/1985 | Park et al. | 363/41 |
| 4,639,849 | 1/1987 | Noworolski et al. | 363/56 |
| 4,862,342 | 8/1989 | Dhyanchand et al. | 363/40 |
| 4,876,635 | 10/1989 | Park et al. | 363/17 |
| 4,969,076 | 11/1990 | Schutten et al. | 363/17 |
| 5,172,309 | 12/1992 | DeDoncker et al. | 363/132 |

FOREIGN PATENT DOCUMENTS 2106164  4/1990  Japan .

*Primary Examiner*—R. Skudy
*Assistant Examiner*—Adolf Berhane
*Attorney, Agent, or Firm*—Meltzer, Lippe, Goldstein, Wolf, Schlissel & Sazer

[57] ABSTRACT

A method of controlling a current resonant parallel type switching regulator comprises providing a current circulating circuit for preventing a circuit loss increasing phenomenon from occurring due to an increase in a resonant current caused by an increase in a resonant voltage when an output load current is reduced, forming a closed circuit which connects the opposite terminals of a resonant circuit for inverting the polarity of the charge on the resonant circuit once, and then starting the operation of the regulator. The resonant current is reduced so that an excessive power is not supplied at a low load. Stresses on the switching elements and circuit losses are minimized.

5 Claims, 4 Drawing Sheets

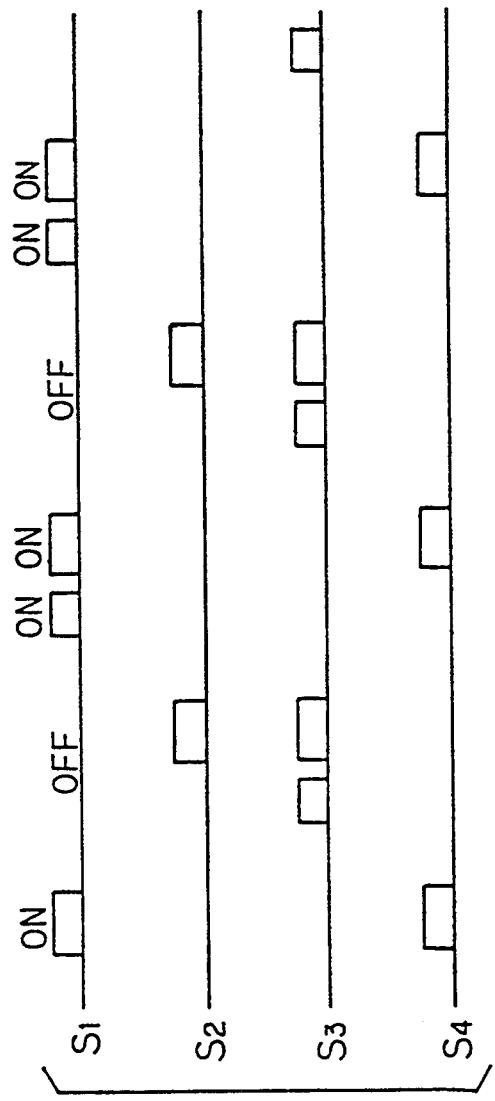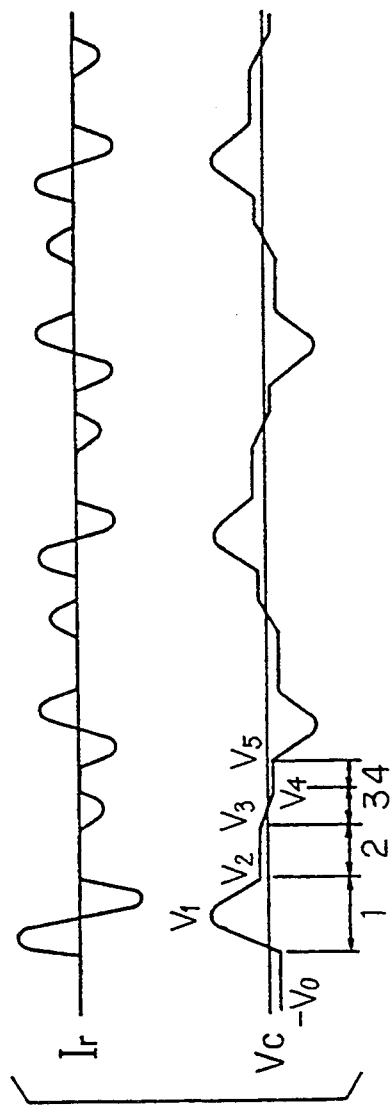
FIG. 3(1)
FIG. 3(2)

METHOD OF CONTROLLING SWITCHING REGULATOR

BACKGROUND OF THE INVENTION

1. Field of the Invention

The present invention relates to a method of controlling a switching regulator and in particular to a method of controlling a resonant type switching regulator for providing a d.c. voltage or current.

2. Prior Art

The systems of controlling an output voltage of separately-excited switching regulators include an FM control system in which the turning-on period is constant and the switching frequency (period) is controlled, a PWM control system in which the switching frequency is constant and the turning-off period is controlled and an FM/PWM combined system in which both systems are combined. Each system has its own features. The FM control system has a disadvantage in that the switching frequency varies remarkably and when the switching frequency becomes shifted to a very low frequency range, uncomfortable noise is audible. The PWM control system has a disadvantage in that the switching losses on current interruption increase to lower the conversion efficiency since switching elements are switched on conduction of a resonant current. The FM/PWM combined control system is operated such that the FM control system is operated on a normal operation and the PWM control system is operated only when an output load or an output voltage is lowered.

In contrast to this, a resonant type switching regulator is capable of reducing the switching losses and enhancing the conversion efficiency by performing a switching operation when the current or voltage is zero.

However, a residual voltage is generated across a resonant capacitor in the resonant type switching regulator when the output load becomes low. When the switching regulator is shifted to the next switching operation phase, an excessive resonant current flows due to the residual voltage across the resonant capacitor. Excessive stresses are imposed upon circuit components and switching elements, resulting in high circuit losses.

A resonant type switching regulator shown in FIG. 2 has a resonant circuit including a resonant inductor Lr and a resonant capacitor Cr. If it is assumed that switches S1 and S4 be turned on in initial conditions when the initial voltage V0 across the capacitor voltage Vc and the initial current I0 of the resonant current Ir are zero, a voltage Vc across the capacitor having a wave form shown in FIG. 4(2) is transferred to a d.c. output unit via a main transformer T1.

When the load current is very low, the current flowing through the smoothing coil L0 in the d.c. output unit exhibits a discontinuous (on/off) characteristic. The resonant circuit functions as follows: The resonant capacitor Cr has been charged so that an initial voltage having a polarity which is determined on completion of the previous operation phase is established thereacross. When the switches S1 and S4 are simultaneously turned on in this condition, the current Ir flows through a path $E(+) \rightarrow S1 \rightarrow Lr \rightarrow Cr \rightarrow S4 \rightarrow E(-)$. The current Ir and voltage Vc as shown in the left side of FIG. 5(2) are obtained. When the switches S2 and S3 are turned in the next operation phase, the initial voltage Vc across the resonant capacitor Cr becomes V0.

This relation shows that the voltage V0 is added to the voltage of a d.c. power source E. The circuit current Ir becomes an excessively high resonant current as shown in FIG. 5(2), resulting in large circuit losses.

When the operation periodically proceeds, the primary winding N1 of the main transformer T1 is connected at the opposite terminals thereof to the opposite ends of the resonant capacitor Cr so that a d.c. voltage E0 is obtained across the load resistor R via the secondary windings N2 and N3 and the rectifying circuit including the rectifying diodes D5 and D6, the smoothing coil L0 and the smoothing capacitor C0. If the circuit losses are neglected, the d.c. voltage E0 which is proportional to the average voltage across the resonant capacitor Cr is obtained.

When a current flows through the smoothing coil L0, an output characteristic is obtained as shown in FIG. 4(2) and a resonant voltage in which the initial value V0 is zero is constantly obtained. When the current flowing through the smoothing coil L0 becomes very low, a discontinuous characteristic of the current is exhibited. An output voltage characteristic represented as Vc in FIG. 5(2) is obtained. The capacitor voltage Vc becomes an excessively higher voltage in comparison with that when a continuous current flows through the smoothing coil L0.

SUMMARY OF THE INVENTION

The present invention aims at solving the above mentioned problems of the prior art.

It is therefore an object of the present invention to provide a method of controlling a switching regulator in which stresses on switching elements and circuit losses which are otherwise caused by a resonant current are minimized by providing a control circuit to establish a current circulating circuit at a low output load for inverting the charging polarity of a resonant capacitor.

In order to accomplish the above mentioned object of the present invention, there is provided a method of controlling a current resonant parallel type switching regulator comprising: providing a current circulating circuit for preventing a circuit loss increasing phenomenon from occurring due to an increase in a resonant current caused by an increase in a resonant voltage when an output load current is reduced; forming a closed circuit which connects the opposite terminals of a resonant circuit for inverting the polarity of the charge on the resonant circuit once; and then starting the operation of the regulator.

In the prior art switching regulator, the initial voltage of a resonant capacitor on starting of switching is added in series to an input d.c. power source voltage when the load becomes low. An excessively high current flows through the circuit whenever switching elements are turned on so that high stresses are imposed upon the circuit. In contrast to this, in accordance with the present invention, the opposite terminals of the resonant capacitor are connected to each other by turning predetermined circuit elements on after the resonance is completed in the case in which the above mentioned problem may arise at a low load. The charging polarity of the resonant capacitor is thus inverted once for recharging the resonant capacitor so that a voltage across the capacitor has a polarity opposite to that of the input d.c. voltage. The peaks of the resonant current and the resonant voltage on switching are suppressed so that the stresses upon circuit and circuit losses are suppressed to very low values.

BRIEF DESCRIPTION OF THE DRAWINGS

FIGS. 3(1) and 3(2) are timing charts showing the operation of the embodiment of the present invention;

DESCRIPTION OF THE EMBODIMENT

An embodiment of the present embodiment will be described with reference to the drawings.

Figure 1:
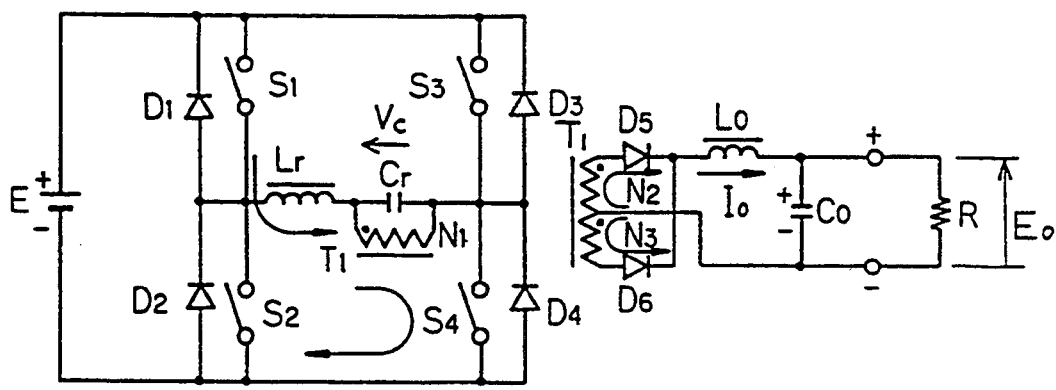
FIG. 1 is a circuit diagram showing an embodiment of a resonant type switching regulator of the present invention.
Figure 2:
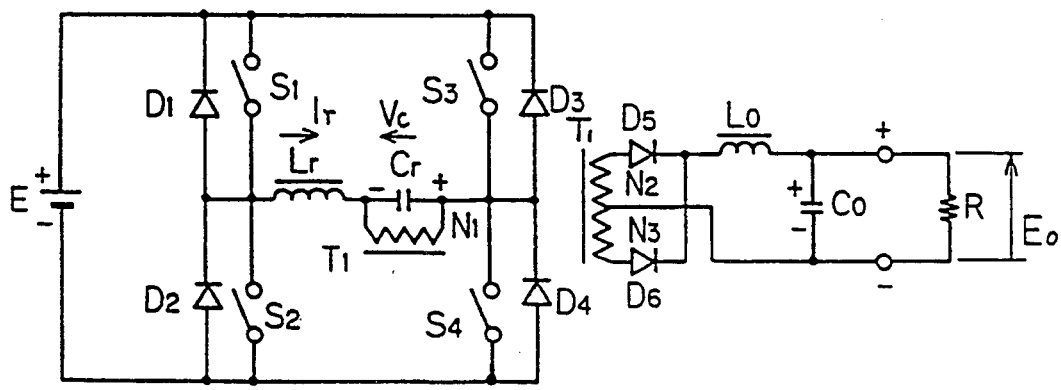
FIG. 2 is a circuit diagram showing a prior art resonant type switching regulator.

Referring now to FIG. 1, there is shown a resonant type switching regulator circuit.

A d.c. power source E is connected to switches S1 to S4 which are arranged in a bridge manner. Diodes D1 to D4 are connected in parallel with the switches S1 to S4, respectively.

Series-connected resonant inductor and capacitor Lr and Cr are connected between a connecting point between the switches S1 and S2 and a connecting point between the switches S3 and S4. A primary winding N1 of a main transformer T1 is connected in parallel with the resonant capacitor Cr. The beginning terminals of the transformer are represented by marks "•". The switches S1 to S4 generally comprise semiconductor switching elements such as transistors or MOSFETs.

The secondary windings N2 and N3 of the main transformer T1 are in series. A neutral tap between the secondary windings N2 and N3 is connected to a negative terminal of a smoothing capacitor CO and a negative output terminal. The beginning terminal of the secondary winding N2 is connected to the anode of a rectifying diode D5 and the ending terminal of the secondary winding N3 is connected to the anode of a rectifying diode D6. The cathodes of the rectifying diodes D5 and D6 are commonly connected to each other and are connected to one terminal of a smoothing coil L0. The smoothing coil L0 is connected at the other terminal thereof to a positive terminal of the smoothing capacitor CO and a positive output terminal. A loading resistor R is connected across the output terminals.

Operation of this circuit will now be described.

Referring now to FIG. 3(1), there is shown a timing chart showing turning on or off of the switches S1 to S4. ON and OFF in the drawing represent states in which the switches are closed and opened, respectively. If it is assumed that a current flowing through the smoothing coil L0 has a sufficiently gradual reducing characteristic in comparison with the switching operating period in a normal operation of the circuit, the current can be regarded as a constant current since a change in current is remarkably low during the period of time for which the resonating circuit is active.

When the switches S1 to S4 are turned off, a secondary circuit current circulates through a path L0→R→Ti(neutral tap of the secondary winding)→N2(N3)→anode of D5 (anode of D6)→cathodes of D5, D6→L0. In this state, the circulating current flowing through the smoothing coil L0 flows through the secondary winding N2 from the beginning terminal thereof and through the secondary winding N3 from the ending terminal thereof. In other words, since the currents flow through the secondary windings N2 and N3 in opposite directions, the magnetic fluxes in the main transformer T1 are cancelled with each other so that no electromotive voltage is generated across the secondary winding.

When the switches S1 and S4 in the circuit shown in FIG. 1 are simultaneously turned on in this condition, a resonant current flows through a closed primary winding circuit E(+)→S1→Lr→Cr→S4→E(−). No electromotive voltage is generated across the primary winding N1 of the main transformer T1 in the initial phase similarly to the secondary winding. The resonant current Ir flows through a circuit S1→Lr→TI(N1)→S4 for only a period of time in which the resonant current becomes a current which is obtained by converting the secondary winding current into the primary winding current. No electromotive voltage is generated across the resonant capacitor Cr either in this period of time.

Figure 4:
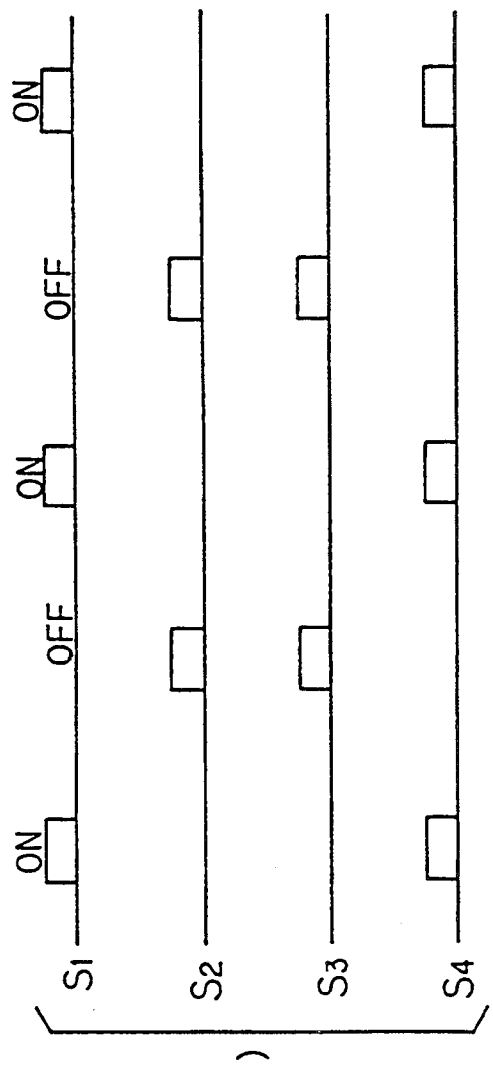
FIGS. 4(1) and 4(2) are timing charts showing the normal operation.
Figure 4:
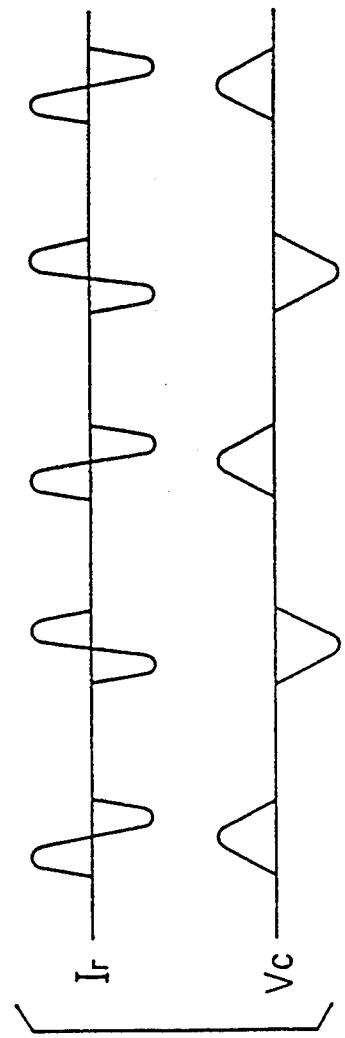

Since a primary equivalent current I01 of the winding has a relationship as follows:

I01=N2.I0/N1, the circuit current flows through a path E(+)→S1→Lr→TN1(Cr)→S4→E(−) when the resonant current Ir becomes the current I01. The resonant current Ir and the resonant capacitor voltage Vc will not become excessive values in such normal operating conditions and appropriately change with time as shown in FIG. 4(2).

The operation, a feature of the present invention in a case where the output load current is lowered will be described. It is assumed that the resonant capacitor Cr has been charged so that −V0 is established as an initial voltage thereacross at a polarity shown in FIG. 3(2). When the switches S1 and S4 are turned on in this state, the resonant current Ir flows through a path E(+)→S1→Lr→Cr→S4→E(−) and is shunted to the primary winding N1 which is connected in parallel with the resonant capacitor Cr so that a voltage V1 is generated for the period 1 as shown in FIG. 3(2).

After completion of the resonant operation, the charge on the resonant capacitor Cr is discharged to the output via the main transformer T1 with the lapse of time if a continuous current flows through the smoothing coil L0. The voltage across the resonant capacitor Cr is gradually lowered. If the load is low and the output current is low, the current flowing through the smoothing coil L0 becomes discontinuous, the charge on the resonant capacitor Cr is not discharged so that the voltage Vc across the capacitor Cr is maintained at a voltage V2 for a period of time 2 as shown in FIG. 3(2).

Figure 5:
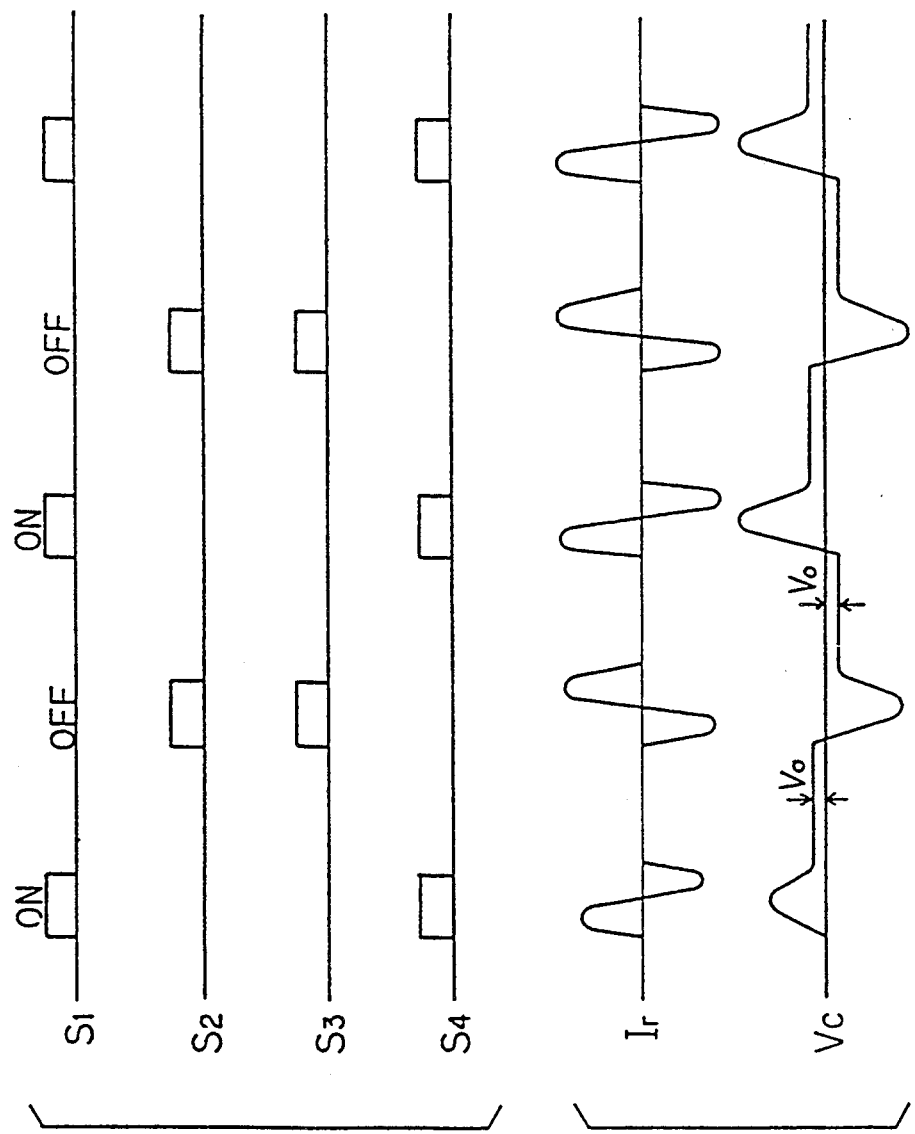
FIGS. 5(1) and 5(2) are timing charts showing that the peaks of the voltage and current are high at a very low load in the prior art switching regulator.

The next operation phase will be described, where the charge on the resonant capacitor Cr is discharged by turning the switch S3 on for the period 3. The current Ic flows through a closed circuit loop Cr→Lr→D1→S3→Cr. The polarity of the voltage Vc is inverted from V3 to V4 for the periods of time 3 and 4 as shown in the drawing. When the switches S2 and S3 are simultaneously turned on after the lapse of the period 4, the circuit current Ir flows through a closed circuit E(+)→S3→Cr(N1)→Lr→S2→E(−) against the initial voltage V5 of the resonant capacitor Cr to provide characteristics in which the peaks of the voltage and the current are suppressed as shown in FIG. 3(2) in comparison with those shown in FIG. 5(2).

In such a manner, the polarity of the voltage of the resonant capacitor Cr is inverted to minimize the resonant current Ir by only turning the switch S3 on once immediately before the switches S2 and S3 are turned on after turning on of the switches S1 and S4.

In accordance with the method of controlling a switching regulator of the present invention, a voltage across a resonant capacitor can be determined for cancelling an input d.c. voltage on starting of switching. Accordingly, since an increase in voltage across the resonant capacitor can be prevented, the stresses on switching elements and circuit losses due to a resonant current can be minimized. This method is effective particularly when a load current is very low.

What is claimed is:

1. A method of controlling a current resonant parallel switching regulator comprising a plurality of switches arranged in a bridge configuration and a resonant circuit connected between output poles of said bridge configuration, said method comprising the steps of:
    providing a current circulating circuit, including one of said switches of said bridge configuration and said resonant circuit, for preventing a circuit loss increasing phenomenon from occurring due to an increase in a resonant current caused by an increase in a resonant voltage when an output load current of said resonant parallel switching regulator is reduced, and
    once in between switching phases of said bridge configuration, forming a closed circuit between opposite polarity terminals of said resonant circuit by closing said switch of said current circulating circuit.

2. The method of claim 1 further comprising the steps of:
    during a first switching phase, simultaneously closing a first switch, connected between a first input terminal and a first output terminal of said bridge, and a fourth switch, connected between a second input terminal and a second output terminal of said bridge,
    during a second switching phase, simultaneously closing a second switch, connected between said second input terminal and said first output terminal of said bridge, and a third switch connected between said first input terminal and said second output terminal of said bridge, and
    once, after said first switching phase but before said second switching phase, closing said third switch.

3. A method of controlling a current resonant parallel switching regulator comprising a plurality of switches arranged in a bridge configuration and a resonant circuit connected between output poles of said bridge configuration, said method comprising the steps of:
    during a first switching phase, simultaneously closing a first switch, connected between a first input terminal and a first output terminal of said bridge, and a fourth switch, connected between a second input terminal and a second output terminal of said bridge,
    during a second switching phase, simultaneously closing a second switch, connected between said second input terminal and said first output terminal of said bridge, and a third switch connected between said first input terminal and said second output terminal of said bridge, and
    preventing a circuit loss caused by an increased resonant voltage under low load current conditions, said step of preventing comprising the step of once, after said first switching phase but before said second switching phase, forming a closed circuit between opposite polarity terminals of said resonant circuit by closing said third switch.

4. The method of claim 3 wherein said current resonant parallel switching regulator further comprises a plurality of diodes including one diode connected in parallel with each of said first, second, third and fourth switches of said bridge configuration and wherein said closed circuit formed in said step of forming comprises a series connection of one of said opposite polarity terminals of said resonant circuit, said diode connected in parallel to said first switch, said third switch, and said other opposite polarity terminal of said resonant circuit.

5. The method of claim 3 wherein said step of preventing is performed independently of the voltage across said switches.

* * * * *